E. F. BEUGLER.
MACHINE FOR HEADING UP BARRELS.
APPLICATION FILED JUNE 3, 1920.

1,404,923.

Patented Jan. 31, 1922.
5 SHEETS—SHEET 1.

Inventor,
E. F. Beugler
by Geiper & Pohl
Attorneys.

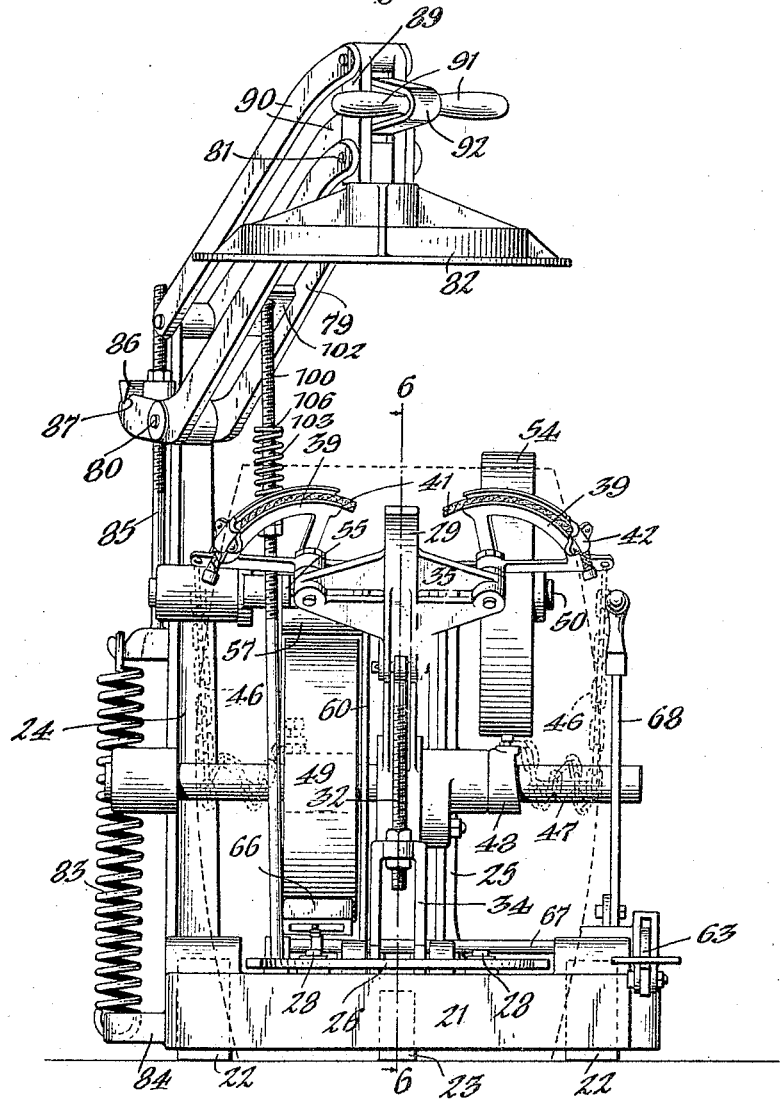
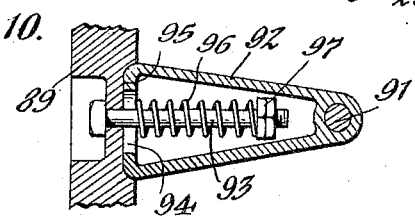

E. F. BEUGLER.
MACHINE FOR HEADING UP BARRELS.
APPLICATION FILED JUNE 3, 1920.
1,404,923.
Patented Jan. 31, 1922.
5 SHEETS—SHEET 3.
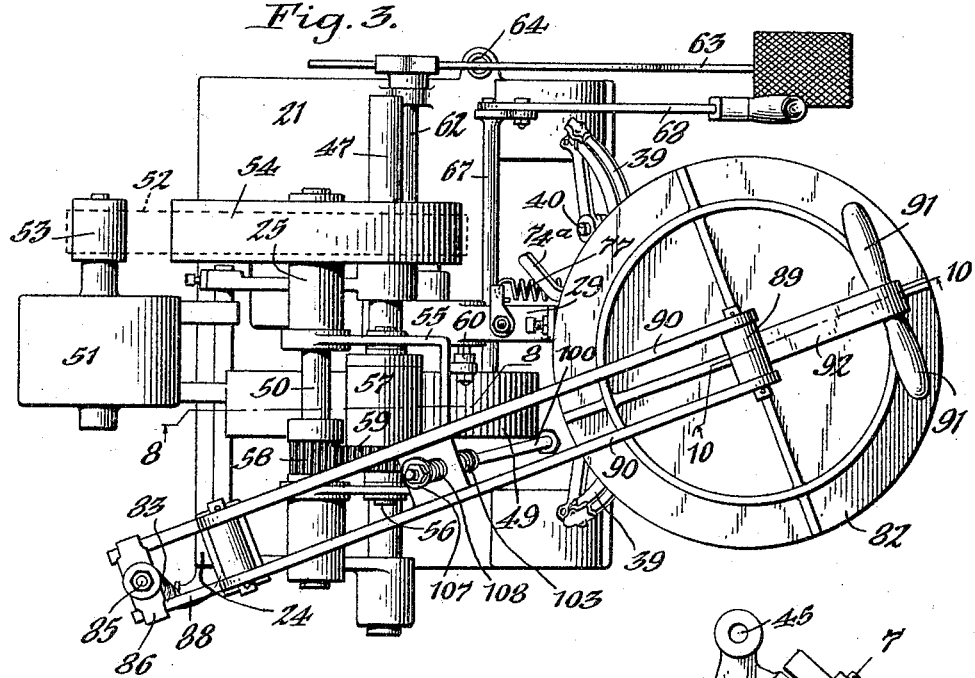
Fig. 3.
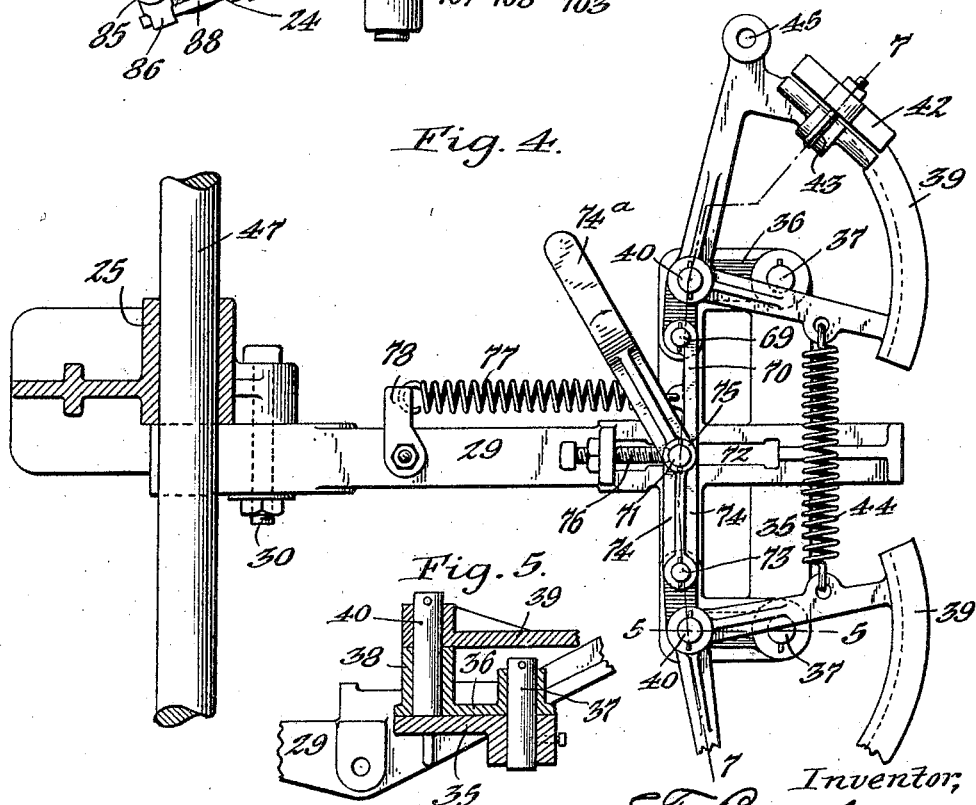
Fig. 4.
Fig. 5.
Inventor;
E. F. Beugler
by Geiger & Popp
Attorneys

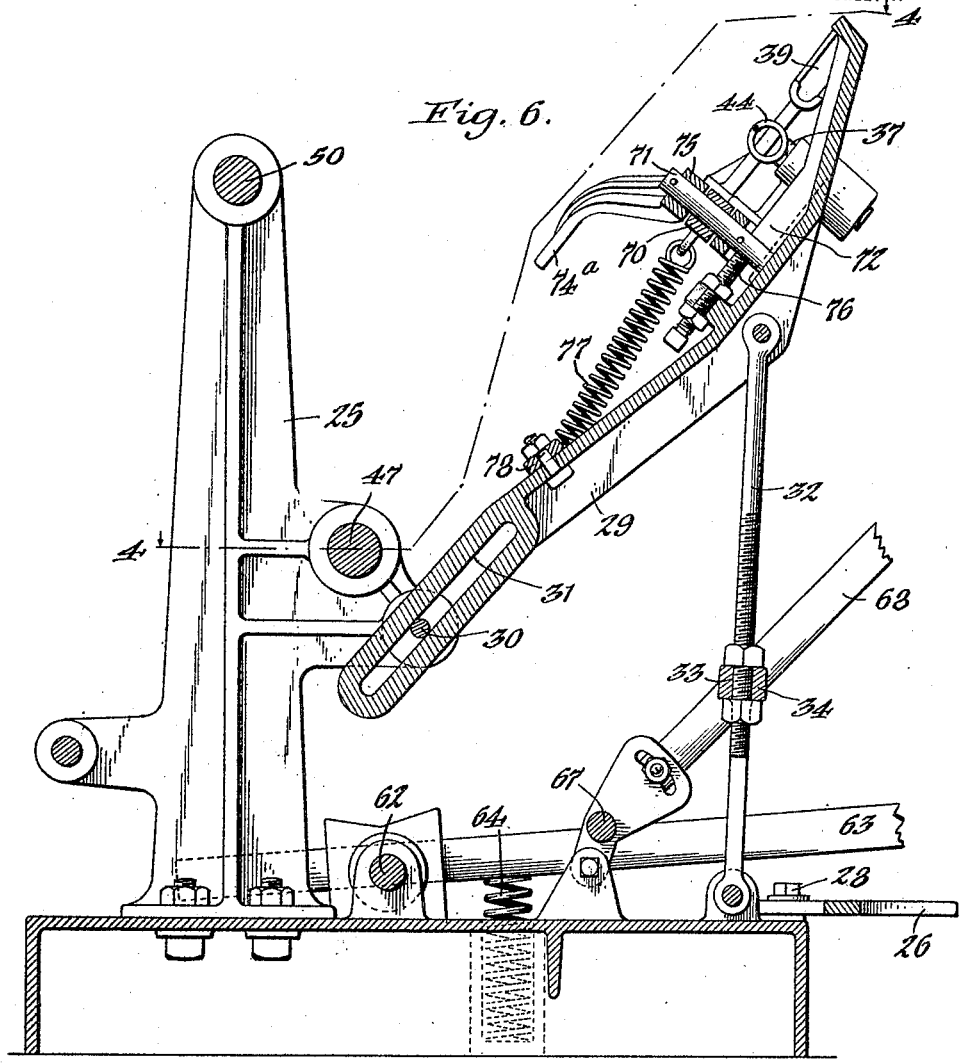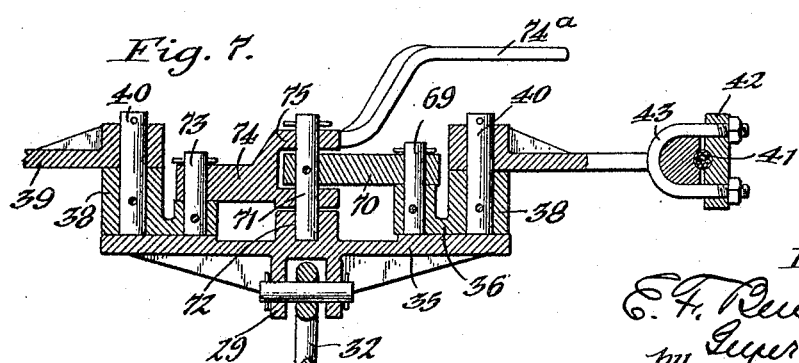

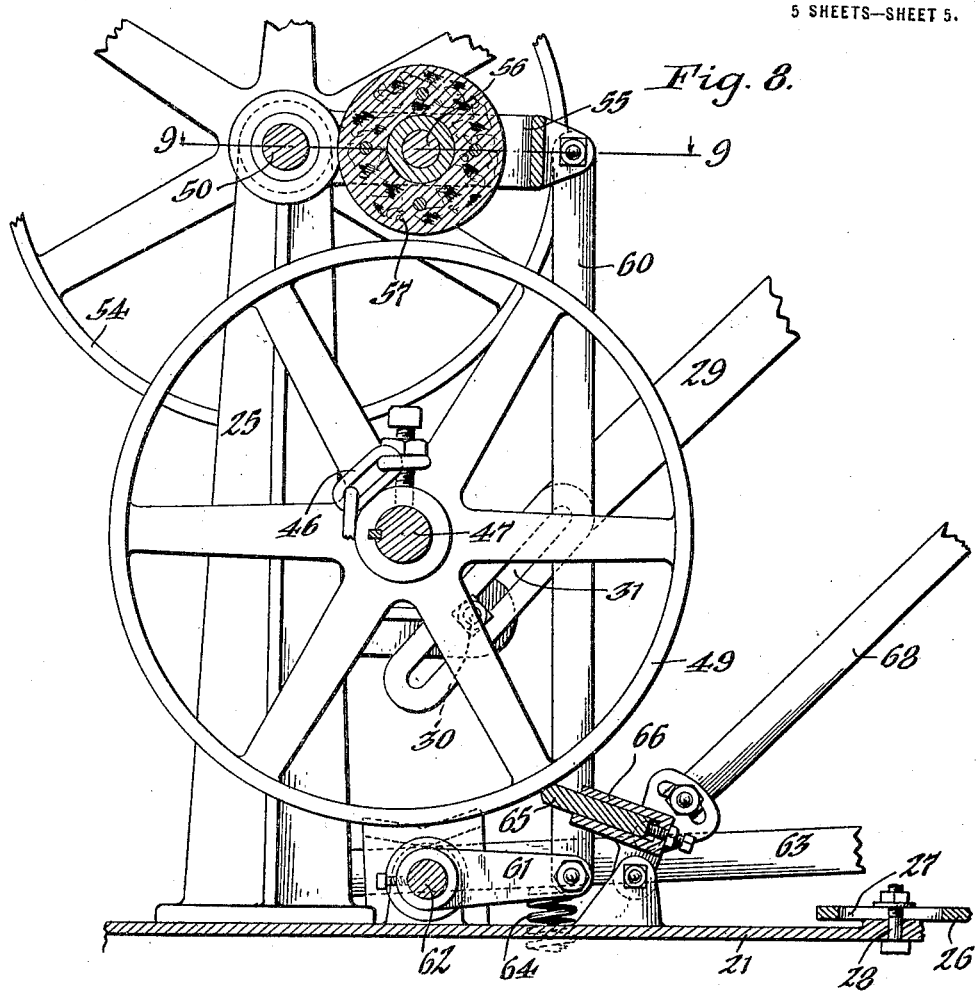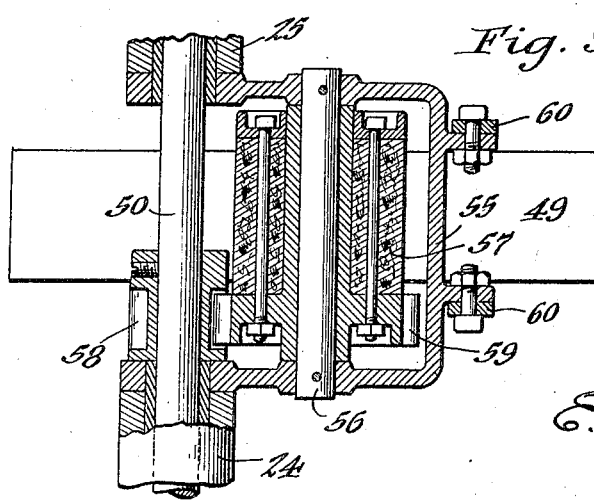

UNITED STATES PATENT OFFICE.

EDWIN F. BEUGLER, OF BUFFALO, NEW YORK, ASSIGNOR TO E. & B. HOLMES MACHINERY CO., OF BUFFALO, NEW YORK, A CORPORATION OF NEW YORK.

MACHINE FOR HEADING UP BARRELS.

1,404,923. Specification of Letters Patent. Patented Jan. 31, 1922.

Application filed June 3, 1920. Serial No. 386,166.

*To all whom it may concern:*

Be it known that I, EDWIN F. BEUGLER, a citizen of the United States, residing in Buffalo, in the county of Erie and State of New York, have invented new and useful Improvements in Machines for Heading Up Barrels, of which the following is a specification.

This invention relates to a machine for putting the heads on barrels and more particularly the upper head of barrels which have previously been filled with material.

It is the object of this invention to produce a machine of this character which is comparatively simple in construction and which enables heads to be applied to barrels expeditiously and with a minimum expenditure of labor and power.

Figure 1:
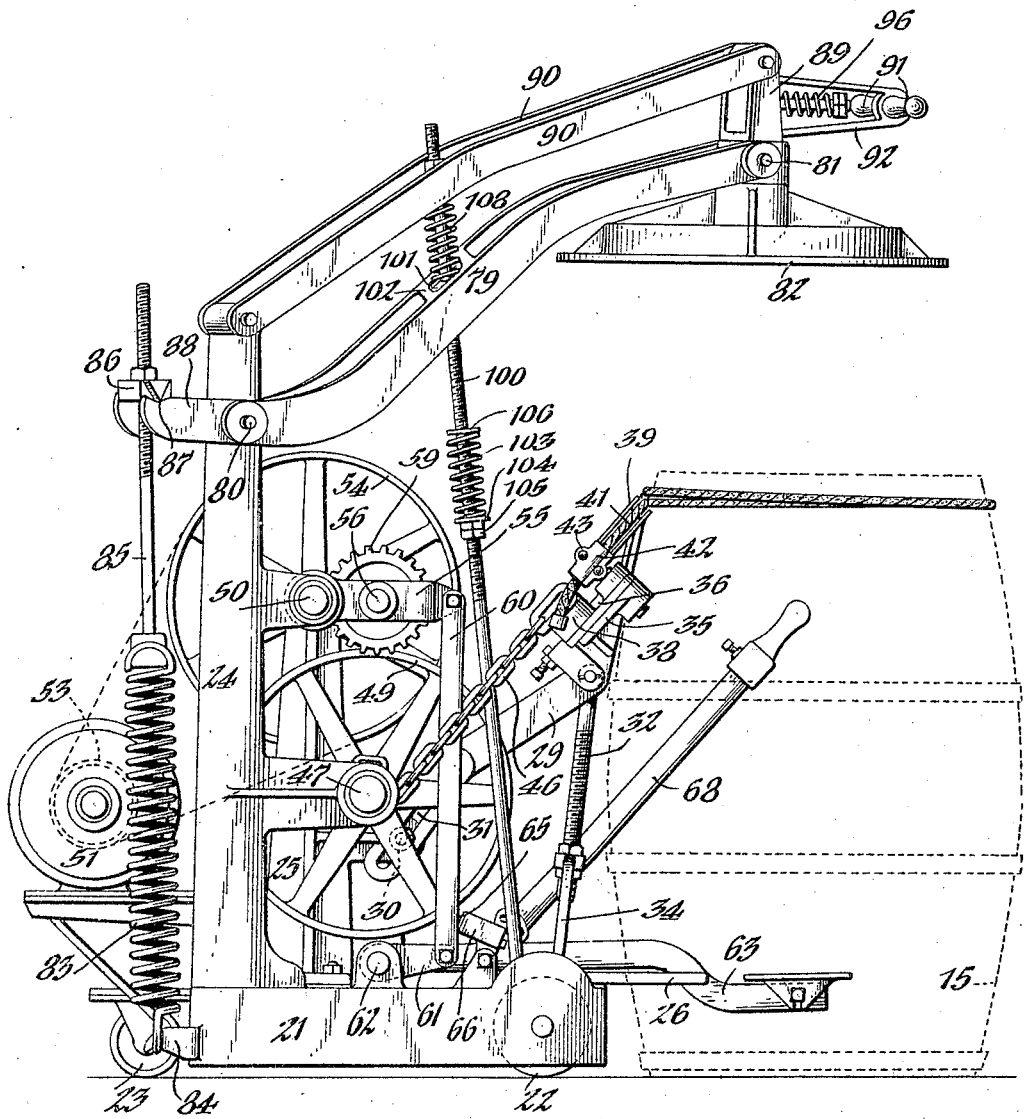
Figure 11:
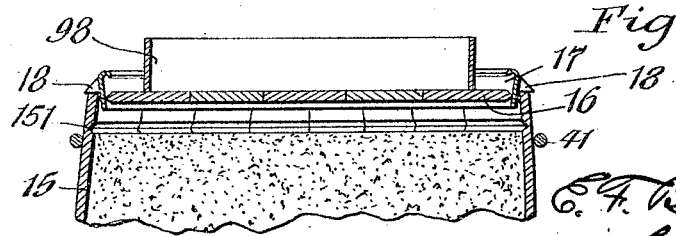

In the accompanying drawings:

Figure 1 is a side elevation of the improved machine viewed from the left hand side thereof. Figure 2 is a front view thereof. Figure 3 is a top plan view thereof. Figure 4 is an enlarged fragmentary horizontal section on line 4—4, Fig. 6. Figure 5 is a horizontal section on line 5—5, Fig. 4. Figure 6 is an enlarged vertical section on line 6—6, Fig. 2. Figure 7 is an enlarged transverse section on line 7—7, Fig. 4. Figure 8 is an enlarged vertical section on line 8—8, Fig. 3. Figure 9 is a horizontal section on line 9—9, Fig. 8. Figure 10 is an enlarged fragmentary vertical section on line 10—10, Fig. 3. Figure 11 is a fragmentary sectional view of a filled barrel showing the position of the head sections of a barrel head preparatory to being fitted in place by this improved machine.

Similar characters of reference refer to like parts throughout the several views.

Referring to Fig. 11, 15 represents the shell of a barrel of ordinary construction which is filled with material and to which the upper head 16 is to be applied by this improved machine to reliably seal the contents therein. Preparatory to being secured in the upper end of the barrel, the various sections which comprise the head are placed in an assembled position in an expansible holder 17 of any suitable construction, said holder being preferably provided with external supports 18 projecting laterally therefrom, which are adapted to rest on the upper edge of the shell of the barrel during the operation of applying the head thereto.

In its general organization, this machine comprises means for contracting the upper end of the filled barrel for the purpose of temporarily removing the uppermost hoop thereof, means for automatically expanding the barrel to permit of applying the head thereto, and a heading device for securing the head in place in the barrel.

The main frame of the machine for supporting the various working parts thereof may be of any suitable construction, but preferably comprises a base 21 supported at its front end by rollers 22, and at its rear end by a caster 23 arranged centrally of said base, and two uprights or standards 24, 25 arranged at the rear end of the base. While being operated upon, the barrel rests on the floor at the front end of the machine, and a supporting saddle 26 mounted on the front end of the base serves to properly center the barrel to the machine before applying the head thereto. This saddle is concave on its outer side to conform to the curvation of the barrel, and to permit it to properly position barrels of various sizes, said saddle is adjustable lengthwise of the base 21 and for this purpose is provided with a pair of longitudinal slots 27, 27 which cooperate with bolts 28 secured in said base.

The means whereby the barrel is expanded and contracted for the purpose of applying the head thereto, are preferably constructed as follows:

29 indicates a supporting arm or bracket whose inner end is adjustably mounted lengthwise relatively to the base 21 to suit barrels of different diameters, while its outer end is adjustable vertically to suit barrels of different heights. The inner end of this bracket is adjustably mounted on the standard 25 by means of a bolt 30 passing through an opening in said standard and through a longitudinal slot 31 in the bracket, while pivotally connected to its outer end is a depending screw threaded adjusting rod or link 32 passing through a screw-threaded opening 33 in the upper end of a yoke 34 pivotally connected to the base of the machine, as shown in Fig. 6. The upper end of the bracket 29 is provided with a support or table 35 extending laterally from opposite sides thereof and mounted on the upper side of each end of this support is an L-shaped lever or rock member 36 pivoted at 37, as shown in Figs. 4 and 5 and adapted to swing laterally thereof. The central portion or hub 38 of each lever carries an oscillatory quadrant section or frame 39 fulcrumed thereon by means of a stud 40 and secured to the rim or periphery of each of these quadrant frames are the opposite ends of a rope 41 which is crossed at the center to form a loop which fits around the upper end of the barrel as is customary with machines of this character. Each end of this rope is preferably secured to the respective quadrant section by a clamping bar 42 adjustably fastened to said frame by a U-bolt 43. The inner ends of the quadrant sections are yieldingly connected to each other by a spring 44 which normally tends to hold the same in a fixed position relatively to each other and prevents them from swinging idly about their pivots. Attached to an eye 45 of each quadrant frame 39 is a windlassing cable or chain 46 operatively connected to a winding mechanism, which in the construction shown in the drawings, consists of a horizontal transverse shaft 47 journaled on the standards 24, 25 of the machine frame. These cables are employed to control the size of the rope loop co-operating with the barrel and are so arranged as to be simultaneously wound about the shaft 47 in the operation of contracting the upper end of the barrel to secure the head thereto. One end of the cable 46 is fastened to a collar 48 fixed to the shaft 47, while the other end is fastened to the hub of a pulley wheel 49 employed for driving said shaft as will be hereinafter described.

The means for transmitting motion to the pulley wheel 49 to drive the shaft 47 and cause the cables 46 to be wound upon the shaft 47 and thereby tighten the loop about the barrel, are preferably constructed as follows:

50 indicates the main driving shaft journaled in the upper ends of the standards 24, 25, and driven by an electric motor 51 or other source of power through the medium of a belt 52 passing around a pulley 53 on the motor shaft and around a pulley 54 keyed to said driving shaft. Journaled on the latter intermediate the standards 24, 25 is a swinging frame or yoke 55 on which is mounted an arbor 56 carrying a friction wheel 57, which is adapted to operatively engage the periphery of the pulley wheel 49. This friction wheel is driven from the driving shaft 50 by a pinion 58 fixed to the latter and meshing with a gear wheel 59 mounted on said friction wheel. Pivotally connected to the outer end of the swinging frame 55 are a pair of depending links 60 the lower ends of which are pivotally connected to a pair of rocker arms 61 mounted on a transverse shaft 62 actuated by a foot lever 63 fixed to the outer end of said shaft. When the foot lever is depressed the friction wheel 57 is brought into frictional contact with the periphery of the pulley wheel 49, transmitting motion to the latter and effecting a rotation of the shaft 47 to wind the windlassing cable thereon and draw the loop tightly around the barrel. A spring 64 interposed between the base 21 of the machine frame and the underside of the foot lever tends to hold the friction wheel above or out of contact with the pulley wheel 49.

A suitable brake device is employed for stopping the rotation of the pulley wheel 49 when desired and also for preventing backward rotation of the windlassing shaft 47 and loosening of the rope about the barrel. This brake device preferably consists of a brake shoe 65 adjustably mounted in a housing 66 provided at one end of a transverse rock member 67 fulcrumed at opposite ends to the base of the machine. Secured to the other end of the rock member is an operating handle or lever 68 which is inclined forwardly and extends in a direction opposite to that of the brake shoe. The latter is normally held in frictional contact with the underside of the pulley wheel 49 by gravity, the weight of the operating lever overbalancing that of the brake shoe.

Means are provided, independent of the windlassing mechanism, for permitting a slack to be taken in the loop of the windlassing rope 41, in order to permit of a necessary expansion of the barrel shell after the removal of the uppermost or head hoop and preparatory to applying the head thereto. This feature is essential, inasmuch as the diameter of the top of the barrel, after the same has been windlassed tightly to permit of the removal of the head hoop, is too small to permit the insertion of the head in the mouth of the barrel. The means, whereby this result is accomplished, consists of a yieldable toggle connection between the rock members 36, which permits of moving the latter inwardly to increase the size of the loop around the barrel to cause a temporary expansion of the same preparatory to setting the head holder 17 in the upper end thereof. As shown in the drawings these means are preferably constructed as follows:

Pivoted to a stud 69 on the inner arm of one of the rock members 36 is the outer end of a link 70. Secured to the inner end of this link is an upright pin or post 71 movable lengthwise in a groove or channel 72 provided in the upper end of the supporting bracket 29. Fulcrumed on a stud 73 on the inner arm of the other rock member 36 is an operating lever 74 having a handle 74ª and whose central portion is forked or bifurcated, as shown at 75, and pivotally connected to the pin 71 to which the inner end of the link 70 is also connected. A stop bolt 76, adjustably mounted on the bracket 29 limits the inward movement of the pin 71 and the latter is normally held against said stop bolt by a spring 77, one end of which is conncted to the link 70 and the other end to a lug 78 secured to said supporting arm. When the lever 74 is pulled outwardly in the direction of the arrow, Fig. 4, the rock members 36, carrying the quadrants 39 to which the opposite ends of the rope 41 are attached, are swung inwardly about their pivots 37, causing the quadrants to move inwardly or toward each other and cause the loop encircling the barrel to be enlarged sufficiently to enable the barrel shell to expand and permit of the insertion of the holder 17, which supports the head. After the holder is inserted, the operator releases the lever 74 which is forced inwardly by the pressure of the spring 77 until the cable is again tightened about the barrel, the inward movement of said lever being dependent on the size of the head to be fitted to the barrel. As shown by full lines in Fig. 10, in which the parts are in the position above described, the lower edge of the holder 17 is above the annular groove or croze 15$^a$ of the barrel in which the outer edge of the head is seated when the head is secured thereto.

The heading device, which forces the head in proper position into the croze of the barrel, while the upper end thereof is still compressed tightly about the head holder, is preferably constructed as follows:

79 indicates a vertically movable supporting arm fulcrumed at 80 to the standard 24 of the machine frame and extending forwardly and upwardly above the other working parts of the machine so that the extreme outer end thereof is approximately in a vertical line with the axis of a barrel to be operated upon. Mounted on a cross pin 81 arranged in the outer end of this lever is a presser plate or head 82 of circular form and having a flat bottom side. This head together with the arm 79 is normally held in its upward inoperative position, as shown by full lines in the drawings, by one or more tension springs 83, the lower end of which is secured to a hook 84 in the base 21, while the upper end thereof is connected to the lower end of a vertical rod 85. The upper end of the latter is screw-threaded and carries a block or head 86 which is adjustably mounted thereon and whose opposite ends are seated in notches 87 in the rear end portion 88 of the arm 79. The presser plate 82 is provided with an upwardly projecting neck or stem 89 and connecting the upper end of this stem with the top of the standard 24 is a pair of links 90, which are arranged in substantially parallel relation with the arm 79 and move vertically with the latter.

91, 91 indicate a pair of handles which are mounted on opposite sides of a bracket 92 connected to the stem 89 of the presser plate and which are adapted to be grasped by the operator for moving said presser plate downwardly to force the barrel head into the croze of the barrel. For the purpose of eliminating any undue jars to the operator in effecting this movement, the handle carrying the bracket 92 is preferably secured to the stem 89 by a bolt 93 which passes through an opening in said stem and through an elongated opening or slot 94 in the rear wall 95 of said bracket. A coil spring 96 surrounds this bolt and is interposed between the rear wall of the bracket and the nut 97 of said bolt, whereby a yielding or elastic connection is produced between the handles and the presser plate and the shocks incident to forcing the head into place in the barrel are absorbed by this spring, rendering the operator free from excessive jolts.

The presser plate does not engage or come in direct contact with the head of the barrel, but a band or ring 98 is preferably placed on the upper side of the head which receives the blow directly from the presser plate and thereby forces the head into the croze of the barrel. This band is of sufficient height to prevent the presser plate from striking the upper edge of the holder 17, when the head is forced home, and the diameter is such that the joints of the several head sections are all enclosed within the circumference of the band.

In order to absorb the shocks incident to forcing the presser plate downwardly to secure the head in place, a buffer rod 100 is provided which is secured at its lower end to the base 21 of the machine while its upper end passes through an elongated slot 101 arranged in a web or cross-piece 102 of the supporting arm 79, and between the links 90 arranged above the latter. Surrounding this rod below the plane of the supporting arm is a compression spring 103 bearing at its lower end against a washer 104 adjustably mounted on said rod by nuts 105, while its upper end bears against a washer 106 movable relatively to said rod. Interposed between a washer 107 at the upper end of the rod 100 and the upper side of the web 102 of the supporting arm is a coil spring 108. Thus, when the presser plate is moved downwardly the underside of the web of the supporting arm engages the washer 106, whereby the shocks incident to forcing the head into the barrel are absorbed by the spring 103, while when the presser plate is released the spring 108 acts to cushion the upward movement of said supporting arm.

The operation of the machine is as follows:

After the filled barrel is set in position in front of the machine, the loop of the rope 41 is placed over the upper end of the same, whereupon the treadle 63 is depressed to operate the windlassing mechanism to cause the loop to be contracted and compress the upper end of the barrel. While in this position, the operator removes the head hoop from the barrel, preparatory to forcing the head in place. Without disturbing the windlassing mechanism, the toggle lever 74ª is pulled outwardly to increase the size of the loop encircling the barrel and thereby expand the latter sufficiently to permit of supporting the head holder 17 on the upper edge thereof. The lever 74ª is now released and the staves automatically contract tightly around the head holder under the pressure exerted by the spring 77 which tends to move the rock members outwardly and thereby reduce the size of the loop of the rope 41. After thus placing this holder on the top edge of the barrel with the ring 98 resting on the assembled head sections, the presser plate 82 is quickly forced downwardly, causing the head sections to be displaced from the holder and snap into engagement with the croze 151 of the barrel. The holder, together with the ring 98 is now removed from the barrel, and the staves further compressed about the head by again depressing the lever 63 to operate the windlassing mechanism, after which the head hoop is secured in place, and the brake shoe 65 released from engagement with the pulley wheel 49 to unwind the windlass cables and permit of removing the loop from the barrel.

I claim as my invention:

1. A machine for heading up barrels comprising a frame, a vertically movable arm fulcrumed on said frame, a pressure plate mounted on said arm and adapted to force the head into the croze of the barrel, a windlass including a loop encircling the barrel, means for reducing the size of the loop for contracting the barrel at its upper end, and means independent of said first named means for temporarily increasing the size of the loop and permit expansion of the barrel at its upper end.

2. A machine for heading-up barrels comprising a windlass including a loop encircling the barrel, means for reducing the size of the loop for contracting the barrel at its upper end, and means independent of said first-named means for temporarily increasing the size of the loop and permit expansion of the barrel at its upper end.

3. A machine for heading-up barrels comprising a windlass including a winding member, a cable operatively engaging said member, a loop-forming member encircling the barrel and whose opposite ends are operatively connected to the corresponding ends of said cable, and means independent of said windlass for temporarily increasing the size of the loop and permit expansion of the upper end of the barrel.

4. A machine for heading-up barrels comprising a frame, a windlass including a winding member, quadrant sections movably mounted on said frame, a cable which operatively engages said winding member and whose opposite ends are connected to said quadrant sections, a loop-forming member which is adapted to encircle the barrel and whose opposite ends are connected to said quadrant sections, and means for actuating the latter to increase the size of said loop-forming member.

5. A machine for heading-up barrels comprising a frame, a windlass including a winding member, a supporting bracket mounted on said frame, a pair of quadrant sections fulcrumed on said bracket and movable relatively to each other, a cable operatively engaging said winding member and having its ends connected respectively to said quadrant sections, a loop forming member which is adapted to encircle the barrel and whose opposite ends are connected respectively to said quadrant sections, and means for actuating the latter whereby the size of said loop-forming member is increased.

6. A machine for heading-up barrels comprising a frame, a windlass including a winding member, a bracket mounted on said frame, a pair of quadrant sections fulcrumed on said bracket and movable toward and from each other, a cable operatively engaging said winding member and having its ends connected respectively to said quadrant sections, a loop-forming member having its ends connected respectively to the latter, means for rotating said winding member in one direction to reduce the size of said loop-forming member, and means for moving said quadrant sections toward each other to increase the size of the loop-forming member.

7. A machine for heading-up barrels comprising a frame, a windlass including a winding member, a bracket mounted on said frame, a pair of quadrant sections fulcrumed on opposite sides of said bracket and movable toward and from each other, a cable operatively engaging said winding member and having its ends connected respectively to said quadrant sections, a loop-forming member having its ends connected respectively to the quadrant sections, means for rotating said winding member in one direction to reduce the size of said loop-forming member, and a toggle connection between said quadrant sections whereby the latter are moved toward each other to increase the size of the loop-forming member.

8. A machine for heading-up barrels comprising a frame, a windlass including a winding member, a bracket mounted on said frame, a pair of rock members mounted on opposite sides of said bracket, a quadrant section fulcrumed on each of said rock members, a cable operatively engaging said winding member and having its ends connected respectively to each of said quadrant sections, a loop-forming member having its ends connected respectively to said quadrant sections, means for rotating said winding member in one direction to reduce the size of said loop-forming member, and a toggle connection between said rock members whereby the latter are moved to increase the size of the loop-forming member.

9. A machine for heading-up barrels comprising a frame, a windlass including a winding member, a bracket mounted on said frame and provided in its upper end with a slot, a pair of rock members mounted on opposite sides of said bracket and movable toward and from each other, a quadrant section fulcrumed on each of said rock members and movable therewith, a cable operatively engaging said winding member and having its ends connected respectively to said quadrant sections, a loop-forming member having its ends connected respectively to said quadrant sections, means for rotating said winding member in one direction to reduce the size of said loop-forming member, toggle levers connected respectively to said rock members, a pin connecting said toggle levers and movable in the slot in said bracket, and means for holding said rock members in their outward position.

EDWIN F. BEUGLER.